(12) United States Patent
Wu

(10) Patent No.: US 11,439,249 B2
(45) Date of Patent: Sep. 13, 2022

(54) PRESSURE REFERENCE RESETTING STRUCTURE OF INFLATABLE MATTRESS

(71) Applicant: Shang-Neng Wu, Taoyuan County (TW)

(72) Inventor: Shang-Neng Wu, Taoyuan County (TW)

(*) Notice: Subject to any disclaimer, the term of this patent is extended or adjusted under 35 U.S.C. 154(b) by 832 days.

(21) Appl. No.: 16/254,578

(22) Filed: Jan. 22, 2019

(65) Prior Publication Data

US 2020/0229610 A1 Jul. 23, 2020

(51) Int. Cl.
*A47C 27/08* (2006.01)
*G01L 17/00* (2006.01)
*A47C 27/10* (2006.01)
*G05D 16/00* (2006.01)

(52) U.S. Cl.
CPC .......... *A47C 27/083* (2013.01); *A47C 27/082* (2013.01); *A47C 27/10* (2013.01); *G01L 17/00* (2013.01); *G05D 16/028* (2019.01)

(58) Field of Classification Search
CPC ... G01L 17/00; G01L 19/0053; G05D 16/028; G01D 21/02; A47C 27/083; A47C 27/082; A47C 27/10; A47C 27/081; A47C 31/008
See application file for complete search history.

(56) References Cited

U.S. PATENT DOCUMENTS

| 5,233,974 A * | 8/1993 | Senoue | A61H 9/0078 |
| | | | 5/713 |
| 6,779,557 B2 * | 8/2004 | Weiss | F16K 11/074 |
| | | | 137/624.13 |
| 2015/0034855 A1 * | 2/2015 | Shen | F16K 31/60 |
| | | | 251/314 |
| 2015/0164236 A1 * | 6/2015 | Driscoll, Jr. | A47C 27/082 |
| | | | 5/713 |
| 2021/0015691 A1 * | 1/2021 | Fisk | A47C 21/04 |
| 2021/0076834 A1 * | 3/2021 | Driscoll | A61G 7/05769 |

* cited by examiner

Primary Examiner — Eric J Kurilla
Assistant Examiner — Amanda L Bailey
(74) Attorney, Agent, or Firm — Chun-Ming Shih; HDLS IPR Services

(57) ABSTRACT

A pressure reference resetting structure of an inflatable mattress, the inflatable mattress contains a valve connected with an end of the inflatable mattress, an inflatable air pump connected with the valve, and the valve being connected with a pressure detection pipe which is coupled with a pressure sensing element. The valve includes an air orifice communicated with the pressure detection pipe so that the pressure sensing element detects a pressure of an external environment via the pressure detection pipe and the air orifice, and a reference pressure of the inflatable mattress is reset to inflate the inflatable mattress based on the reference pressure.

4 Claims, 6 Drawing Sheets

PRESSURE REFERENCE RESETTING STRUCTURE OF INFLATABLE MATTRESS

FIELD OF THE INVENTION

The present invention relates to a pressure reference resetting structure of an inflatable mattress which is capable of resetting a reference pressure of the inflatable mattress to inflate the inflatable mattress.

BACKGROUND OF THE INVENTION

A conventional inflatable mattress contains a valve having a pressure detection pipe fixed therein and connected with a pressure sensor. When the pressure sensor detects a pressure of at least one airbag strip reaches a set value, an inflatable air pump stops pumping air into the conventional inflatable mattress.

However, the conventional inflatable mattress cannot be inflated according to a reference pressure in different using conditions, such as in a high altitude mountain or in a flatland. For instance, when the conventional inflatable mattress is located in the high altitude mountain, an ambient pressure is less than that of the flatland. So, the airbag strip assembly is inflated overly at a set pressure value of the flatland to cause using discomfort.

Furthermore, an accuracy of the pressure sensor is influenced because of a temperature difference of day and night, thus causing a pressure error.

The present invention has arisen to mitigate and/or obviate the afore-described disadvantages.

SUMMARY OF THE INVENTION

The primary aspect of the present invention is to provide a pressure reference resetting structure of an inflatable mattress which is capable of resetting a reference pressure of the inflatable mattress to inflate the inflatable mattress.

To obtain above-mentioned aspect, a pressure reference resetting structure of an inflatable mattress provided by the present invention, the inflatable mattress contains: a valve connected with an end of the inflatable mattress, an inflatable air pump connected with the valve, and the valve being connected with a pressure detection pipe which is coupled with a pressure sensing element.

The valve includes an air orifice communicated with the pressure detection pipe so that the pressure sensing element detects a pressure of an external environment via the pressure detection pipe and the air orifice, and a reference pressure of the inflatable mattress is reset to inflate the inflatable mattress based on the reference pressure.

Preferably, the pressure reference resetting structure contains: a first airbag strip assembly and a second airbag strip assembly intervally spaced from and interlocked with the first airbag strip assembly, wherein the valve is connected with an end of the inflatable mattress and an inflatable air pump, and the inflatable air pump is connected with a central control unit, wherein the central control unit includes the pressure sensing element; when resetting the reference pressure, air in one of the first airbag strip assembly and the second airbag strip assembly is exhausted, and air in the other of the first airbag strip assembly and the second airbag strip assembly is stopped.

Preferably, the valve includes a first body and a second body stacked on and rotating relative to the first body.

Preferably, the first body has at least one air input tube extending outward from a peripheral side of the second body, an air chamber defined on a center of a top thereof and communicating with the at least one air input tube, at least one air output tube arranged beside the at least one air input tube respectively, a first air delivery tube and a second air delivery tube which respectively correspond to the at least one air input tube, a first flowing room defined in the top of the air chamber and communicating with the first air delivery tube, a second flowing room defined in the top of the first body and communicating with the second air delivery tube, and the pressure detection pipe formed on a middle section of the first body.

Preferably, the second body has a first air cavity defined on a center of a bottom thereof, a second air cavity surrounding the first air cavity, a cutout formed on the second air cavity, and a connection orifice independently defined within the second air cavity, wherein when the connection orifice is rotated to a predetermined angle, the connection orifice is in communication with the pressure detection pipe; the at least one air output tube is communicated with the second air cavity.

Preferably, the at least one air input tube of the valve is connected with the inflatable air pump, the first air delivery tube is connected with the first airbag strip assembly, the second air delivery tube is coupled with the second airbag strip assembly, and the pressure detection pipe is connected with the pressure sensing element.

DETAILED DESCRIPTION OF THE PREFERRED EMBODIMENTS

Figure 1:
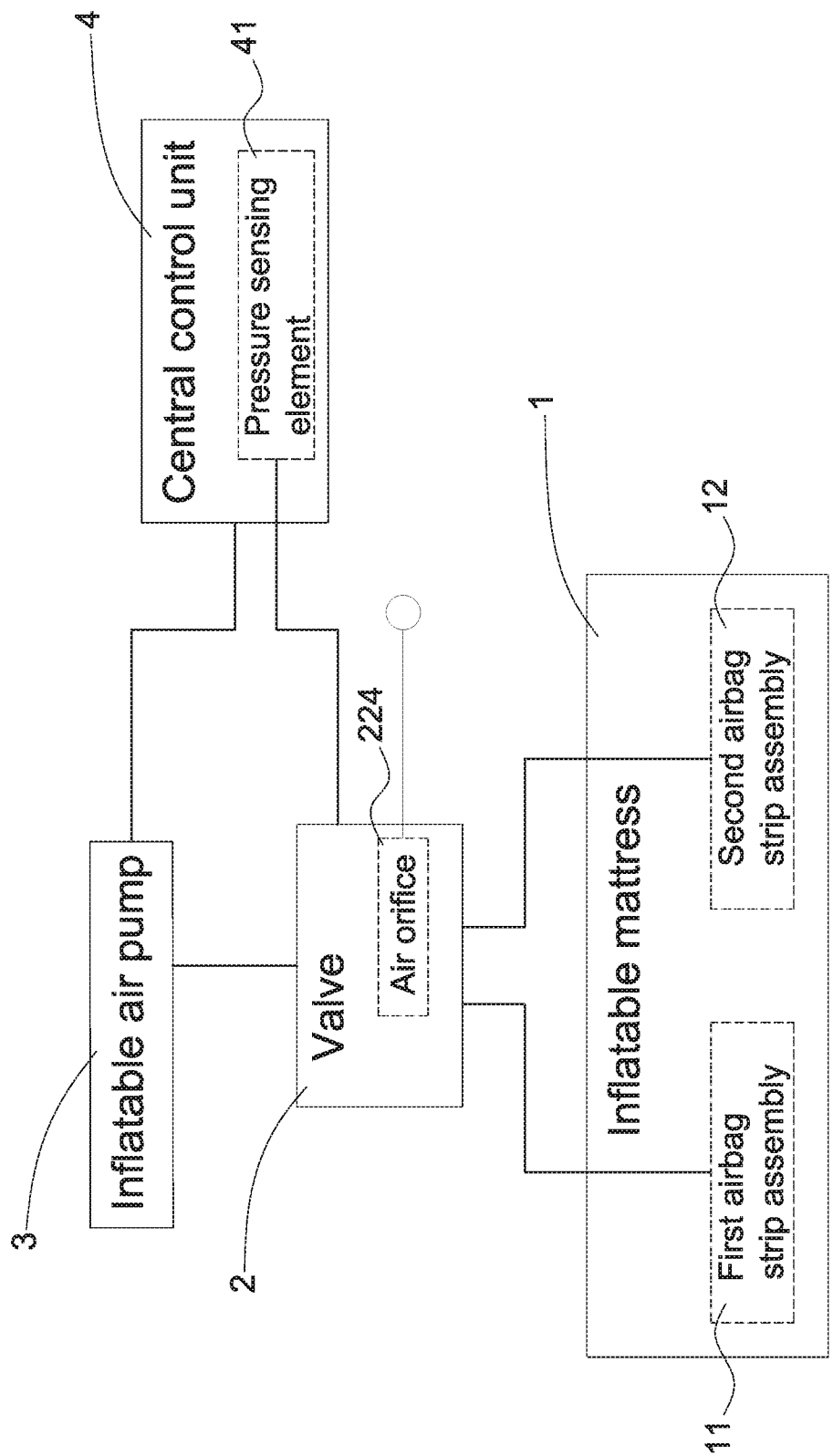
FIG. 1 is a block diagram showing the assembly of a pressure reference resetting structure of an inflatable mattress according to a preferred embodiment of the present invention.
Figure 2:
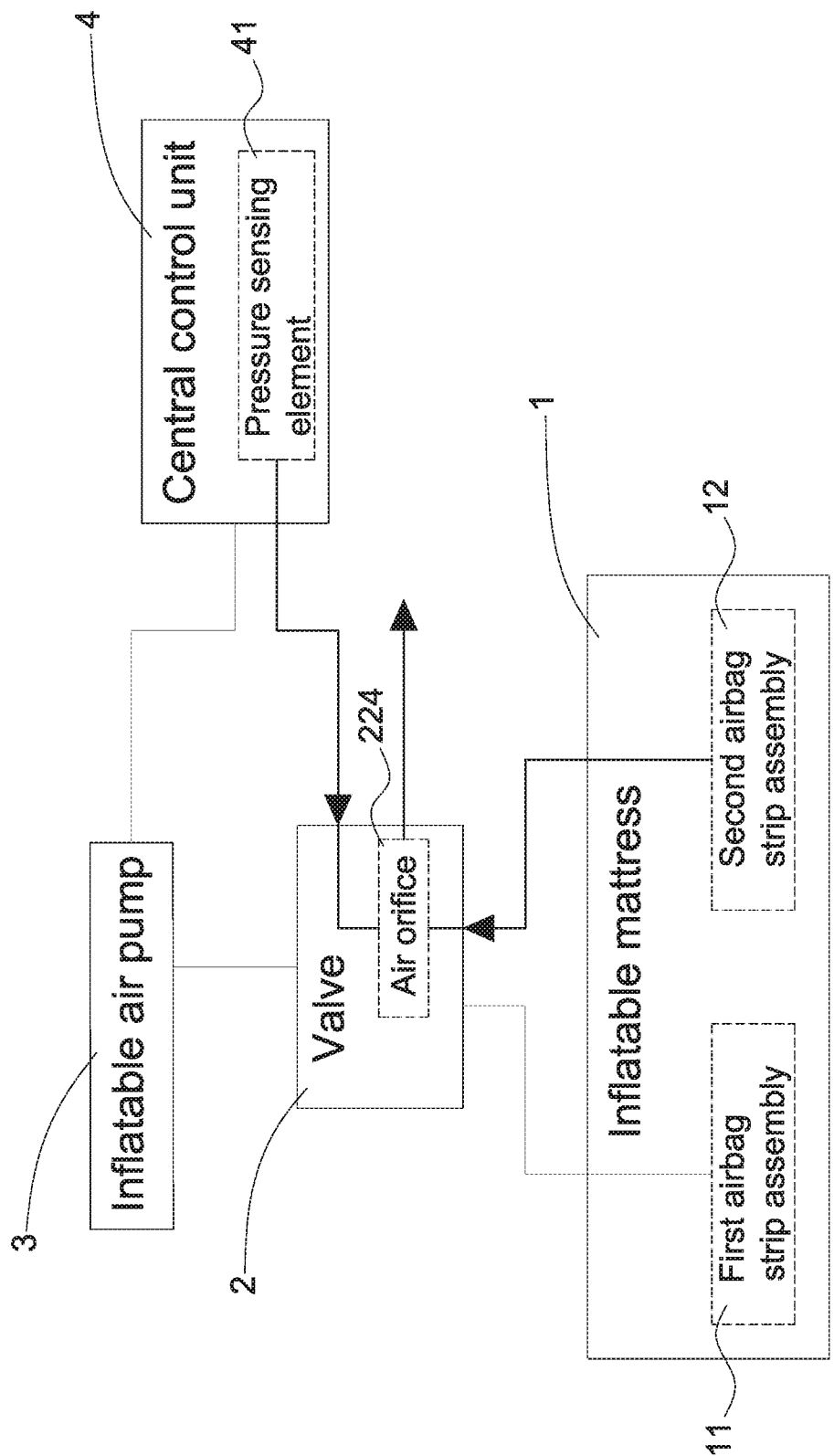
FIG. 2 is a block diagram showing the operation of the pressure reference resetting structure of the inflatable mattress according to the preferred embodiment of the present invention.

With reference to FIGS. 1 and 2, a pressure reference resetting structure of an inflatable mattress 1 according to a preferred embodiment of the present invention comprises: multiple airbag strip assemblies (such as a first airbag strip assembly 11 and a second airbag strip assembly 12 intervally spaced from and interlocked with the first airbag strip assembly 11). A valve 2 is connected with an end of the inflatable mattress 1 and an inflatable air pump 3, and the inflatable air pump 3 is connected with a central control unit 4.

The central control unit 4 includes a pressure sensing element 41 connected with a pressure detection pipe 218 (shown in FIGS. 3-6) on a side of the valve 2.

In operation, the first airbag strip assembly 11 and the second airbag strip assembly 12 are inflated by using the valve 2, then air in one of the first airbag strip assembly 11 and the second airbag strip assembly 12 is exhausted, and air in the other of the first airbag strip assembly 11 and the second airbag strip assembly 12 is stopped so that a user lies down on the inflatable mattress 1. For example, the air is discharged out of the second airstrip bag assembly 12 so that the second airbag strip assembly 12 communicates with a pressure of an external environment. In the meantime, an air orifice 224 of the valve 2 is communicated with the pressure sensing element 41 so that the pressure sensing element 41 detects the pressure of the external environment, thus resetting a reference pressure of the inflatable mattress and obtaining the pressure of the external environment. For example, when the inflatable mattress is located in a high altitude mountain, an atmospheric pressure of the high altitude mountain is less than that of a flatland, so the inflatable mattress is pumped air based on the reference pressure to obtain an exact pressure value of the inflatable mattress in the high altitude mountain.

The central control unit 4 controls the valve 2 to measure the pressure of the external environment, thus providing a pumping pressure to the inflatable mattress.

Figure 3:
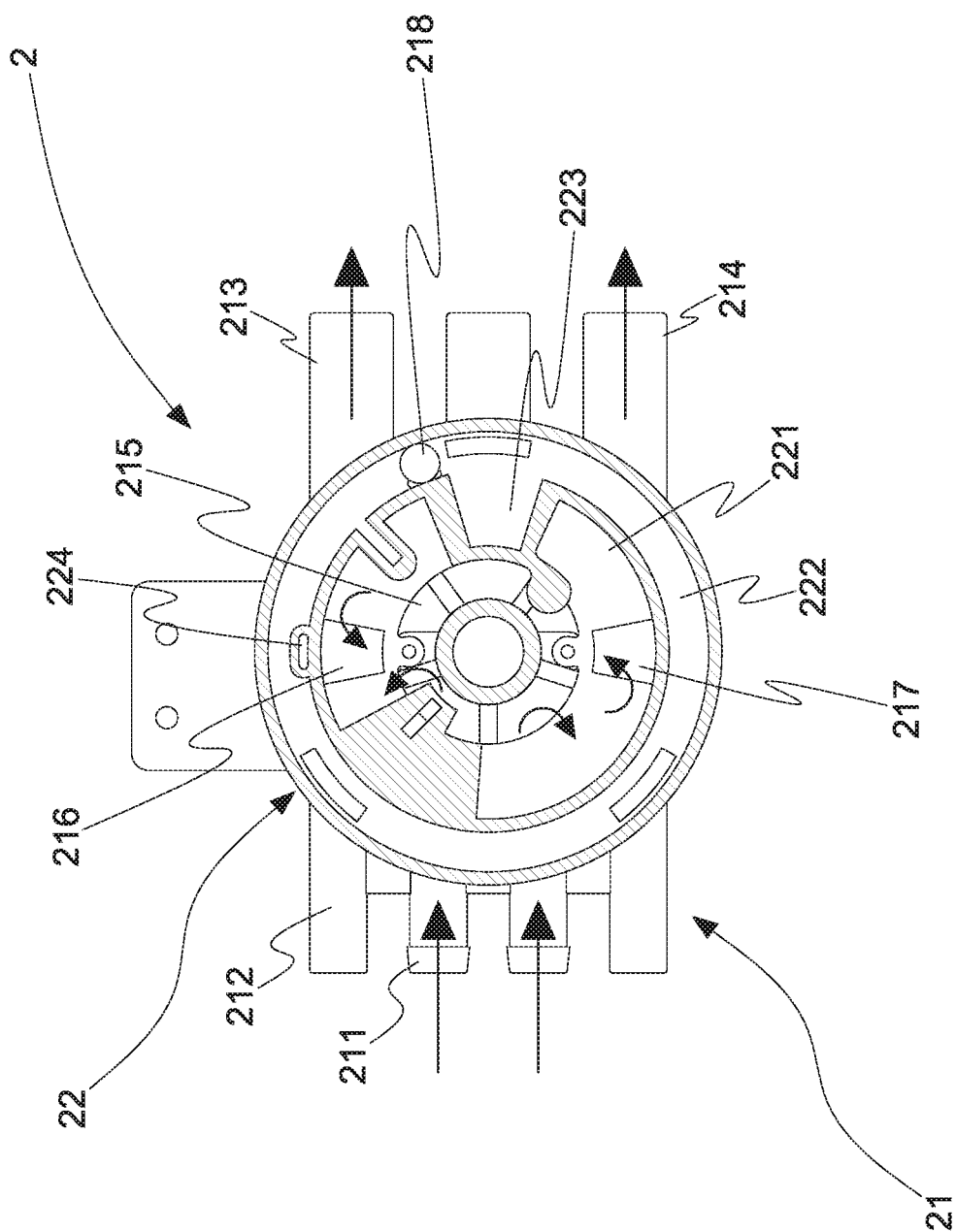
FIG. 3 is a cross sectional view showing the operation of the pressure reference resetting structure of the inflatable mattress according to the preferred embodiment of the present invention.

Referring to FIG. 3, the valve 2 includes a first body 21 and a second body 22 stacked on and rotating relative to the first body 21. The first body 21 has at least one air input tube 211 extending outward from a peripheral side of the second body 22, an air chamber 215 defined on a center of a top thereof and communicating with the at least one air input tube 211, at least one air output tube 212 arranged beside the at least one air input tube 211 respectively, a first air delivery tube 213 and a second air delivery tube 214 which respectively correspond to the at least one air input tube 211, a first flowing room 216 defined in the top of the air chamber 215 and communicating with the first air delivery tube 213, a second flowing room 217 defined in the top of the first body 21 and communicating with the second air delivery tube 214, and the pressure detection pipe 218 formed on a middle section of the first body 21.

The second body 22 has a first air cavity 221 defined on a center of a bottom thereof, a second air cavity 222 surrounding the first air cavity 221, a cutout 223 formed on the second air cavity 222, and a connection orifice 224 independently defined within the second air cavity 222, wherein when the connection orifice 224 is rotated to a predetermined angle, it is in communication with the pressure detection pipe 218.

The at least one air input tube 211 of the valve 2 is connected with the inflatable air pump 3, the first air delivery tube 213 is connected with the first airbag strip assembly 11, the second air delivery tube 214 is coupled with the second airbag strip assembly 12, and the pressure detection pipe 218 is connected with the pressure sensing element 41. The at least one air output tube 212 is communicated with the second air cavity 222.

As shown in FIG. 3, the air flows into the first air delivery tube 213 and the second air delivery tube 214 from the at least one air input tube 211 via the air chamber 215, the first air cavity 221, the first flowing room 216, and the second flowing room 217 so as to inflate the first airbag strip assembly 11 and the second airbag strip assembly 12.

Figure 4:
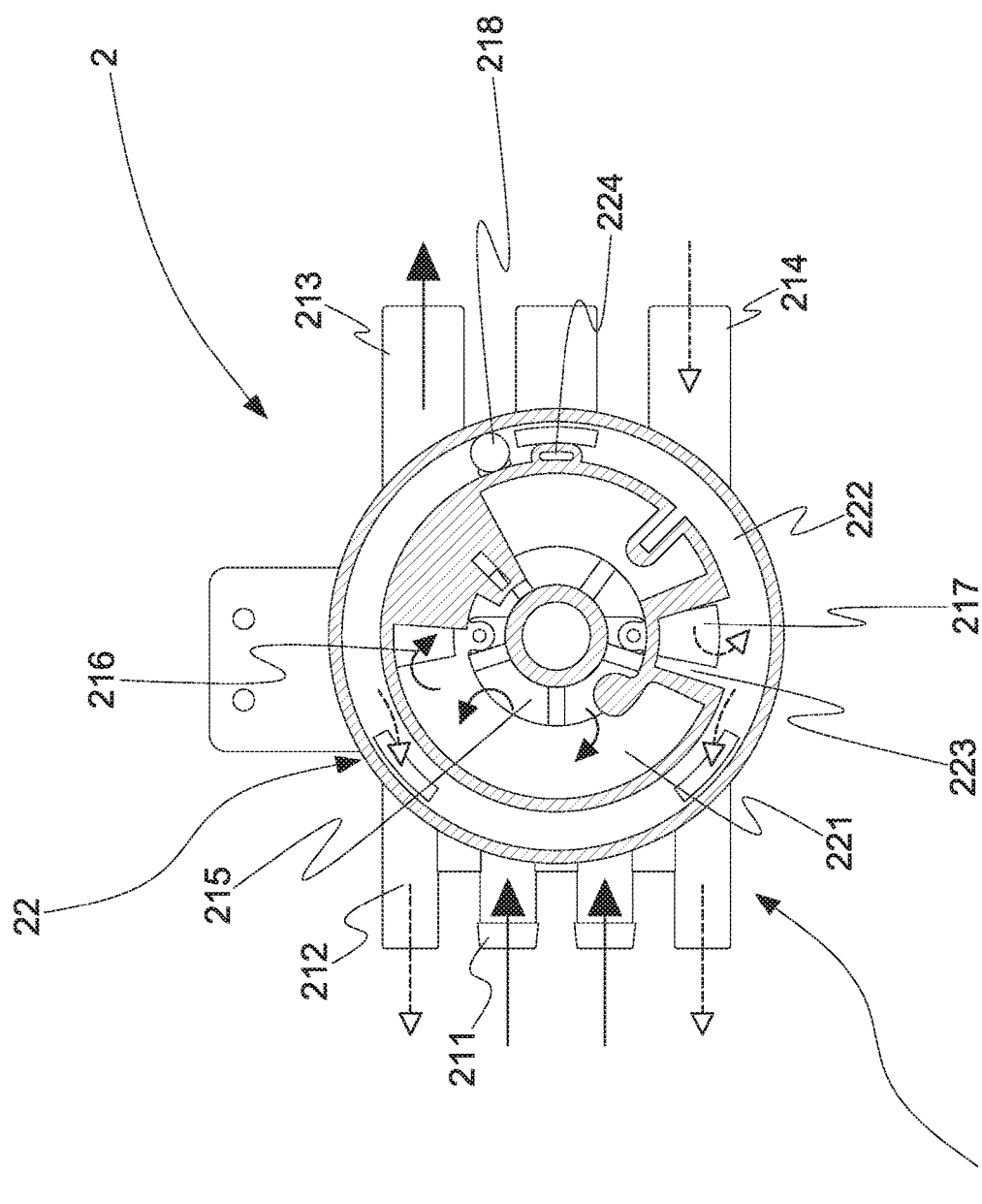
FIG. 4 is another cross sectional view showing the operation of the pressure reference resetting structure of the inflatable mattress according to the preferred embodiment of the present invention.

As illustrated in FIG. 4, the air in the second airbag strip assembly 12 is discharged out of the at least one air output tube 212 via the second air delivery tube 214, the second flowing room 217, the cutout 223, the second air cavity 222, and the at least one air output tube 212, after rotating the second body 22 to a predetermined angle, and the first airbag strip assembly 11 is inflated the air.

Figure 5:
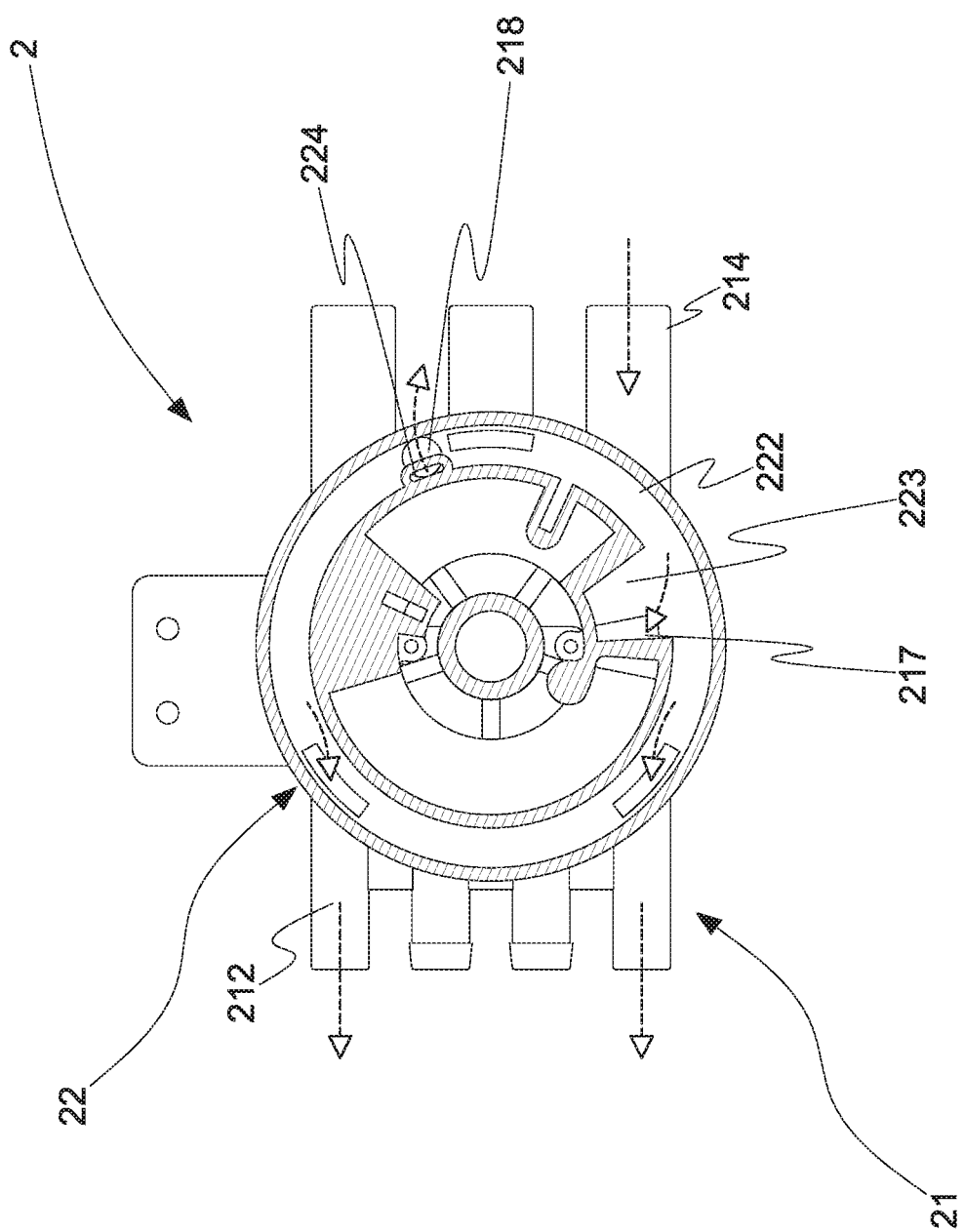
FIG. 5 is also another cross sectional view showing the operation of the pressure reference resetting structure of the inflatable mattress according to the preferred embodiment of the present invention.

With reference to FIG. 5, after the second body 22 is further rotated to another predetermined angle, the air in the second airbag strip assembly 12 is discharged out of the at least one air output tube 212 via the second air delivery tube 214, the second flowing room 217, the cutout 223, and the second air cavity 222. In the meantime, the first air delivery tube 213 is closed so as to maintain the air in the first airbag strip assembly 11 (i.e., the first airbag strip assembly 11 is inflated), and the connection orifice 224 is communicated with the pressure sensing tube 218 so that the pressure sensing element 41 detects the pressure of the external environment, and the central control unit 4 learns the pressure of the external environment to reset the reference pressure and to acquire an ideal pressure value after zeroing the pressure of the inflatable mattress.

Figure 6:
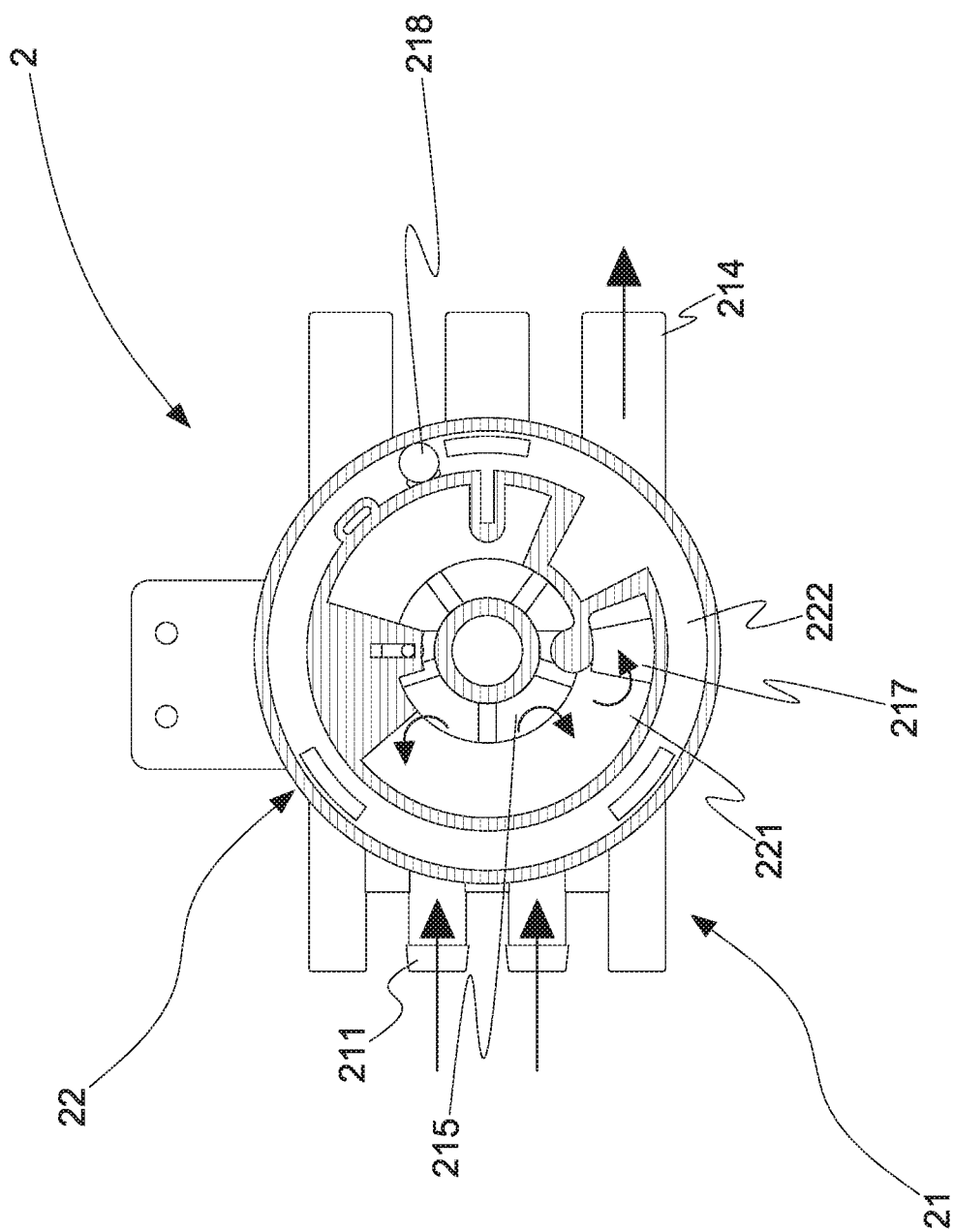
FIG. 6 is still another cross sectional view showing the operation of the pressure reference resetting structure of the inflatable mattress according to the preferred embodiment of the present invention.

As illustrated in FIG. 6, after rotating the second body 22 again, the air flows into the second air delivery tube 214 from the at least one air input tube 211 via the air chamber 215, the first air cavity 221, and the second flowing room 217 so as to inflate the second airbag strip assembly 12. Preferably, the first airbag strip assembly 11 is inflated based on the reference pressure after discharging the air by rotating the valve 2 and zeroing the pressure of the inflatable mattress.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. A pressure reference resetting structure of an inflatable mattress, comprising:
    a valve connected with the inflatable mattress:
    an inflatable air pump connected with the valve;
    a pressure sensing element;
    a pressure detection pipe coupled with the pressure sensing element;
    wherein the valve includes an air orifice communicated with the pressure detection pipe, the pressure sensing element is configured to detect a pressure of an external environment via the pressure detection pipe and the air orifice, and a reference pressure of the inflatable mattress is reset to inflate the inflatable mattress based on the reference pressure;
    wherein the valve includes a first body and a second body stacked on and rotatable relative to the first body; the first body has at least one air input tube extending outward from a peripheral side of the second body, an aft chamber defined on a center of a top of the first body and communicating with the at least one air input tube, at least one air output tube arranged beside the at least one aft input tube respectively, a first air delivery tube and a second air delivery tube which respectively correspond to the at least one air input tube, a first flowing room defined in the top of the air chamber and communicating with the first air delivery tube, a second flowing room defined in the top of the first body and communicating with the second air delivery tube, and the pressure detection pipe formed on a middle section of the first body; the second body has a first air cavity defined on a center of a bottom thereof, a second air cavity surrounding the first air cavity, and a connection orifice independently defined within the second air cavity, wherein when the connection orifice is rotated to a predetermined angle, the connection orifice is in communication with the pressure detection pipe; the at least one air output tube is communicated with the second air cavity.

2. A pressure reference resetting structure of an inflatable mattress, comprising:

a valve connected with the inflatable mattress;

an inflatable air pump connected with the valve;

a central control unit including a pressure sensing element;

a pressure detection pipe coupled with the pressure sensing element;

wherein the valve includes an air orifice communicated with the pressure detection pipe, and the pressure sensing element is configured to detect a pressure of an external environment via the pressure detection pipe and the air orifice; and a first airbag strip assembly and a second airbag strip assembly intervally spaced from and interlocked with the first airbag strip assembly, and a reference pressure is reset by exhausting air in one of the first airbag strip assembly and the second airbag strip assembly, and e holding air in the other of the first airbag strip assembly and the second airbag strip assembly;

wherein the valve includes a first body and a second body stacked on and rotatable relative to the first body;

the first body has at least one air input tube extending outward from a peripheral side of the second body, an air chamber defined on a center of a top of the first body and communicating with the at least one air input tube, at least one air output tube arranged beside the at least one air input tube respectively, a first aft delivery tube and a second aft delivery tube which respectively correspond to the at least one air input tube, a first flowing room defined in the top of the air chamber and communicating with the first aft delivery tube, a second flowing room defined in the top of the first body and communicating with the second air delivery tube, and a pressure detection pipe formed on a middle section of the first body;

the second body has a first aft cavity defined on a center of a bottom thereof, a second air cavity surrounding the first air cavity, and a connection orifice independently defined within the second air cavity, wherein when the connection orifice is rotated to a predetermined angle, the connection orifice is in communication with the pressure detection pipe; the at least one air output tube is communicated with the second air cavity.

3. The pressure reference resetting structure as claimed in claim 1, wherein the at least one air input tube of the valve is connected with the inflatable air pump, and the pressure detection pipe is connected with the pressure sensing element.

4. The pressure reference resetting structure as claimed in claim 2, wherein the at least one air input tube of the valve is connected with the inflatable air pump, the first air delivery tube is connected with the first airbag strip assembly, the second air delivery tube is coupled with the second airbag strip assembly, and the pressure detection pipe is connected with the pressure sensing element.

* * * * *